UNITED STATES PATENT OFFICE.

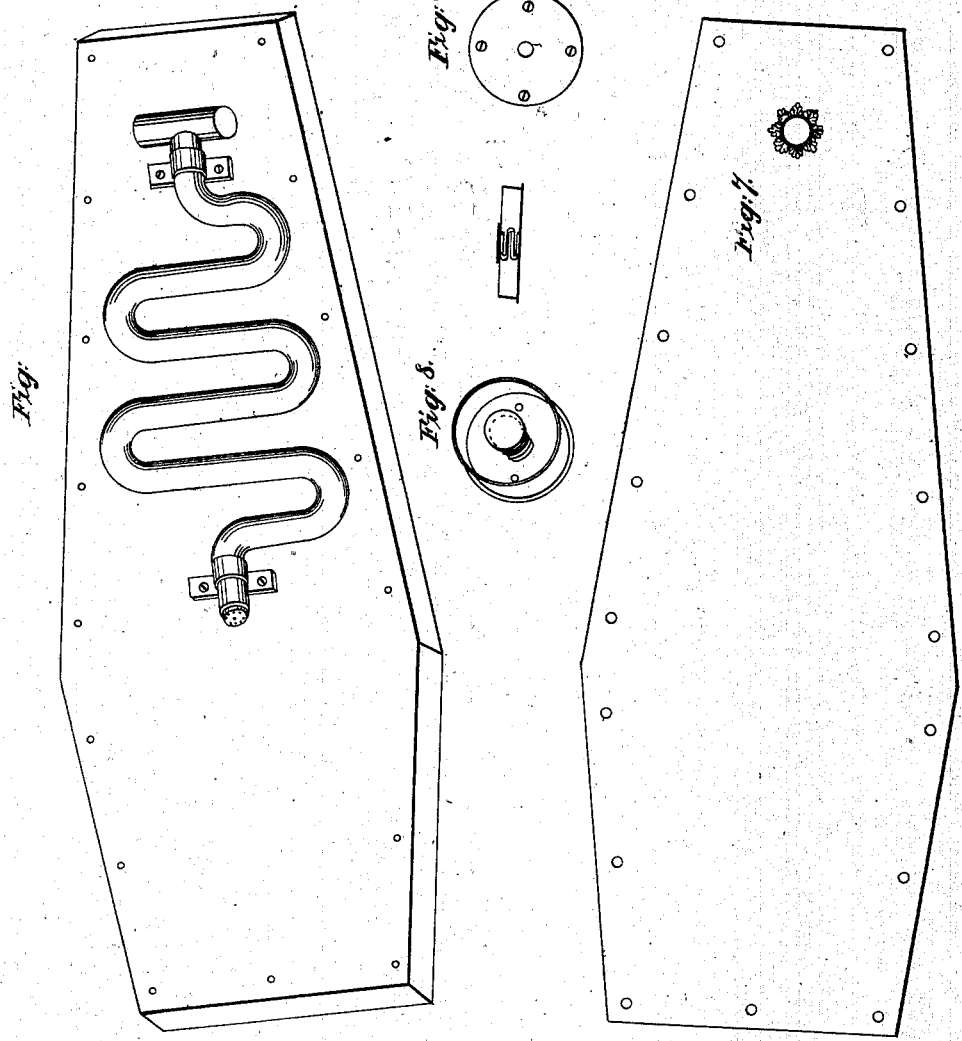

ALFRED E. LYMAN, OF WILLIAMSBURG, MASSACHUSETTS.

IMPROVEMENT IN DEODORIZING COFFINS.

Specification forming part of Letters Patent No. 47,313, dated April 18, 1865.

*To all whom it may concern:*

Be it known that I, ALFRED E. LYMAN, of Williamsburg, county of Hampshire, and State of Massachusetts, have invented a new and useful improvement in machines or apparatus for deodorizing the foul air of offensive gases from coffins, caskets, or burial-cases containing dead bodies, also to prevent the bursting of said coffins, caskets, or burial-cases when too highly charged with said gases; and I do hereby declare that the following is a full and exact description of the same.

The nature of my invention consists in a new apparatus consisting of a crooked or angular tube, round or square, of a zigzag shape, which I call a "receptacle for retaining the material for deodorizing the offensive gases," the said "receptacle and apparatus, its description, construction, and operation of the same," reference being had to the annexed drawings, making a part of this specification, in which—

Figure 1 represents a crooked or angular tube or receptacle; Fig. 2, air chamber, with tube under side; Fig. 3, end of angular tube or receptacle; Fig. 5, under side of the coffin-lid; Fig. 6, outside or top of coffin-lid; Fig. 7, covering over tube and spring-stop or valve; Fig. 4, clasps or fastenings to hold the receptacle on the under side of the coffin-lid or top; Fig. 8, tube to the air chamber and spring-stop or valve; Fig. 9, outside of valve or stop box.

The Fig. 1, as is represented by the crooked or angular tube or receptacle, I make of lead, or of any suitable metallic material, and fill the same with Java, West India, or other good quality of coffee and charcoal combined, or separately, (in sections,) as is most convenient. The coffee or charcoal must be in pieces of sufficient size as to allow the passage of the gases at all times in a sufficient quantity to prevent the bursting of the coffin, caskets, or burial-cases where the pressure is so great as to need an outlet or ventilation. The crooked or angular form I use in order to increase the distance for the passage of the foul gases to pass through, thereby making it more sure to deodorize the said foul gases, so as not to detect any offensive smell during the process of ventilation, and also accomplishing a double purpose of increasing the distance in said receptacle, still not requiring any additional space in the use of the same in the interior of the coffin, casket, or burial-case, and can be used in either wood or metallic coffins.

In Fig. 2, as represented, I connect an air-chamber to the said receptacle, as seen in Fig. 1, with a tube going up through the lid or top of coffin to connect with the stop or valve, the said air chamber being formed separately from the receptacle, and yet connected thereto in such a way as to prevent the escape of the deodorizing material, and giving free egress to the foul air or gases.

In Fig. 3, as seen, is the end of the receptacle with perforated holes for the purpose of letting in the foul gases to the receptacle, so as to come in connection, completely, (or fully,) with the deodorizing material, forcing its passage through the whole length of the receptacle until it is lost in the atmosphere outside of the said coffin, casket, or burial-case.

As seen in Figs. 8 and 9, I make use of a spring stop or valve, formed of india-rubber and wire, so as to be self-acting, always regulating itself by means of a spring being placed within a chamber or box and operating upon the top of the same, and also forcing down the stop or valve closely upon the tube coming out of the air-chamber, and connecting the same with the receptacle, as seen in Figs. 8 and 1.

The covering is seen in Fig. 7. I make use of a metallic ornament of an oval form, covering the chamber in which the spring and stop or valve is placed, thereby giving it a desirable appearance, corresponding suitably with the rest of the outside trimmings of the coffin, casket, or burial-case, and when so constructed and applied, as I have above described, with the above-named materials for deodorizing the machine or apparatus, I cover completely over the outer surface with an indestructible coating of white lead, boiled linseed-oil, and varnish, mixed with suitable sand, this composition being capable of resisting the acids and gases arising from the decomposition of dead bodies, thereby making an article of great utility and usefulness and durability.

I do not require any additional space in either the wood or metalic casket, coffin, or burial-case, thereby making it convenient to apply the deodorizing-machine to any or all of the known forms and styles of coffins, caskets, or burial-cases now in use, as the price will come within the means of all classes of the community needing so desirable an article.

What I claim as my invention, and desire to secure by Letters Patent, is—

The deodorizing-machine, of the crooked or angular form, for the purposes herein described, and substantially set forth.

ALFRED E. LYMAN.

Witnesses:
JAMES WEEKES,
A. D. OSTRANDER.